March 18, 1969 — P. A. MacPHEE ET AL — 3,433,567
CONTACT SCREEN APPLICATION TO VACUUM FILM HOLDER
Filed June 6, 1966 — Sheet 2 of 3
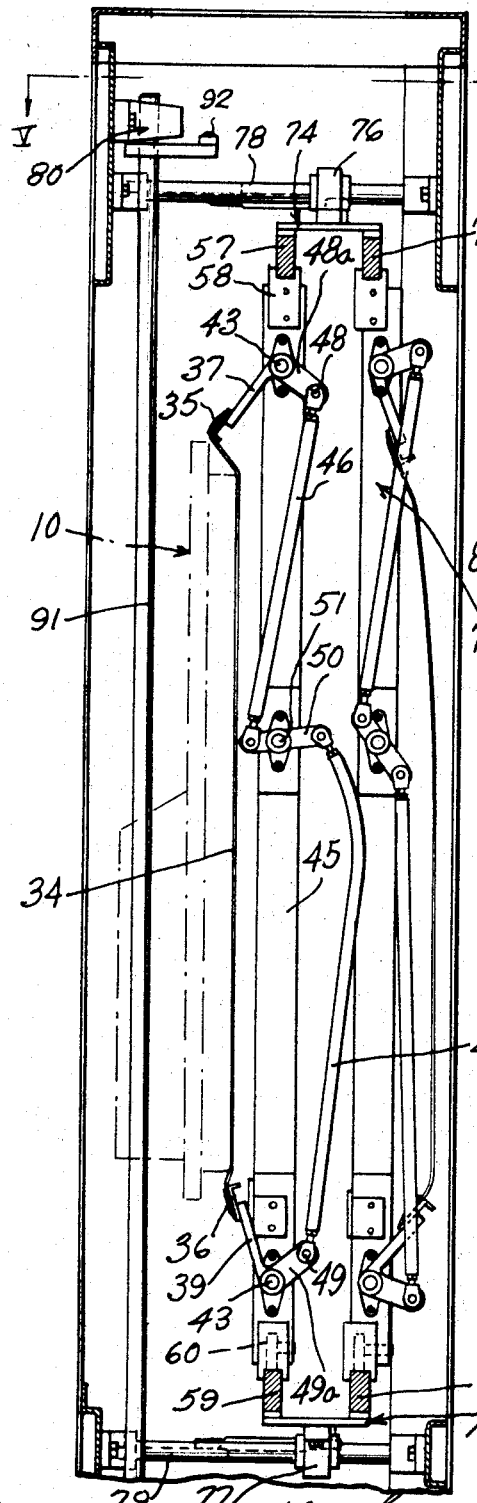
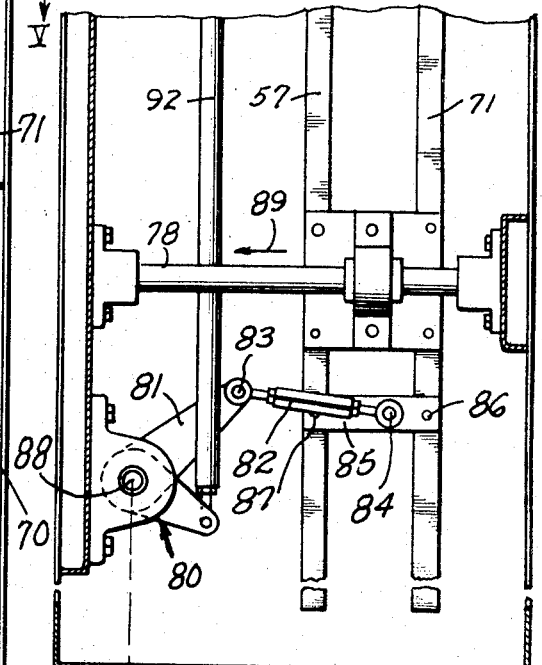
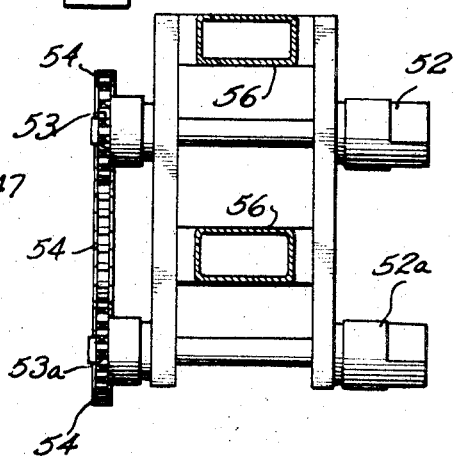
INVENTORS
Paul A. MacPhee
Richard R. Jeschke
Walter Wanielista March 18, 1969 P. A. MacPHEE ET AL 3,433,567
CONTACT SCREEN APPLICATION TO VACUUM FILM HOLDER
Filed June 6, 1966 Sheet 3 of 3

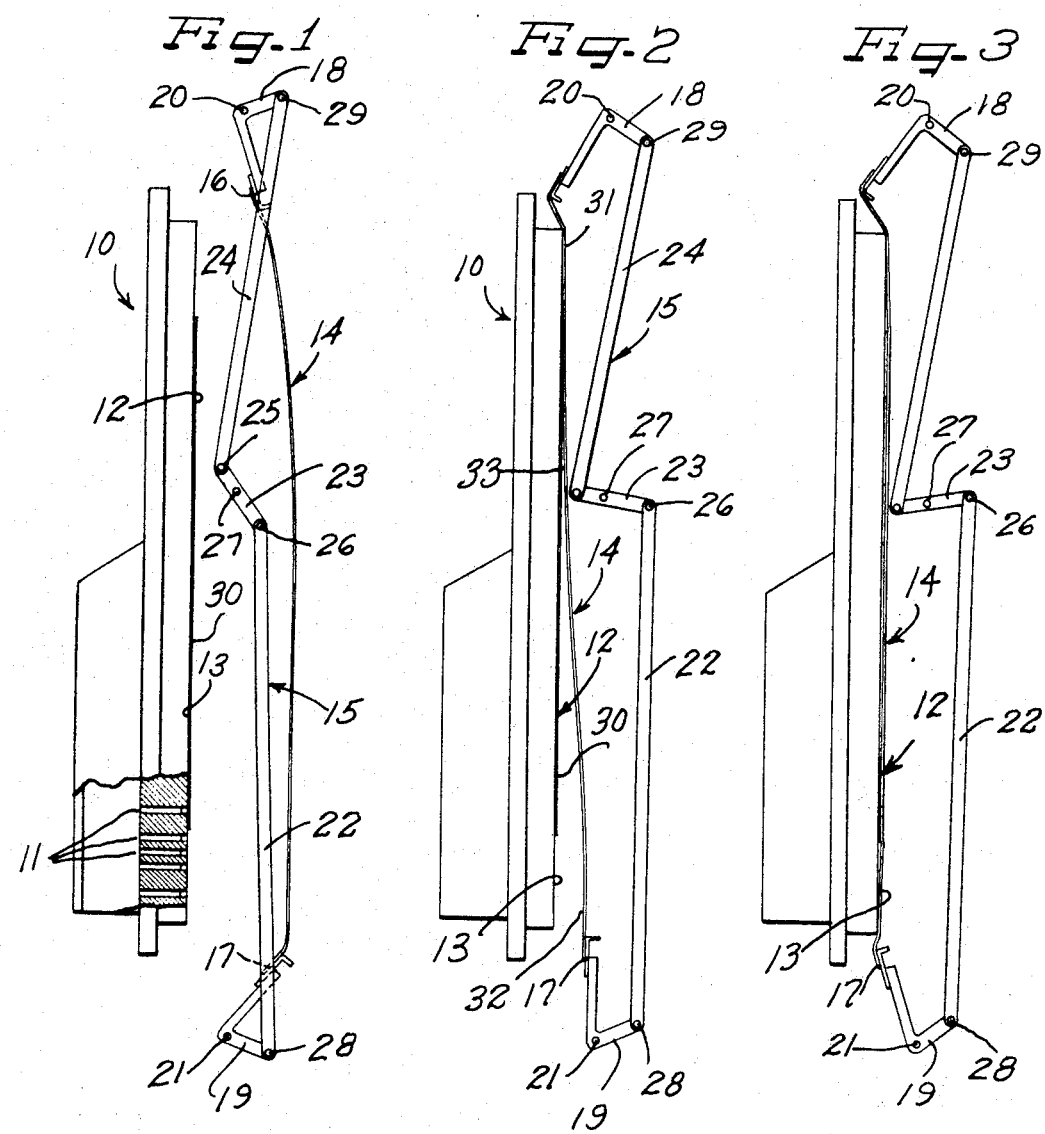

INVENTORS
Paul A. MacPhee
Richard R. Jeschke
Walter Wanielista
BY ATTORNEYS

United States Patent Office 3,433,567
Patented Mar. 18, 1969

3,433,567
CONTACT SCREEN APPLICATION TO
VACUUM FILM HOLDER
Paul A. MacPhee, Barrington, Walter Wanielista, Westchester, and Richard R. Jeschke, Niles, Ill., assignors to Robertson Photo-Mechanix, Inc., Des Plaines, Ill., a corporation of Illinois
Filed June 6, 1966, Ser. No. 555,440
U.S. Cl. 355—76                  10 Claims
Int. Cl. G03b 21/00, 27/20

ABSTRACT OF THE DISCLOSURE

A graphic arts camera having apparatus for applying a flexible contact type half-tone screen to the face of a vacuum film support without wrinkles or air bubbles thereby assuring a smooth overlay of the screen relative to a film sheet and to a means for supplying various size flexible contact type half-tone screens interchangeably to a position for being applied selectively to the vacuum film holder.

---

Figure 6:
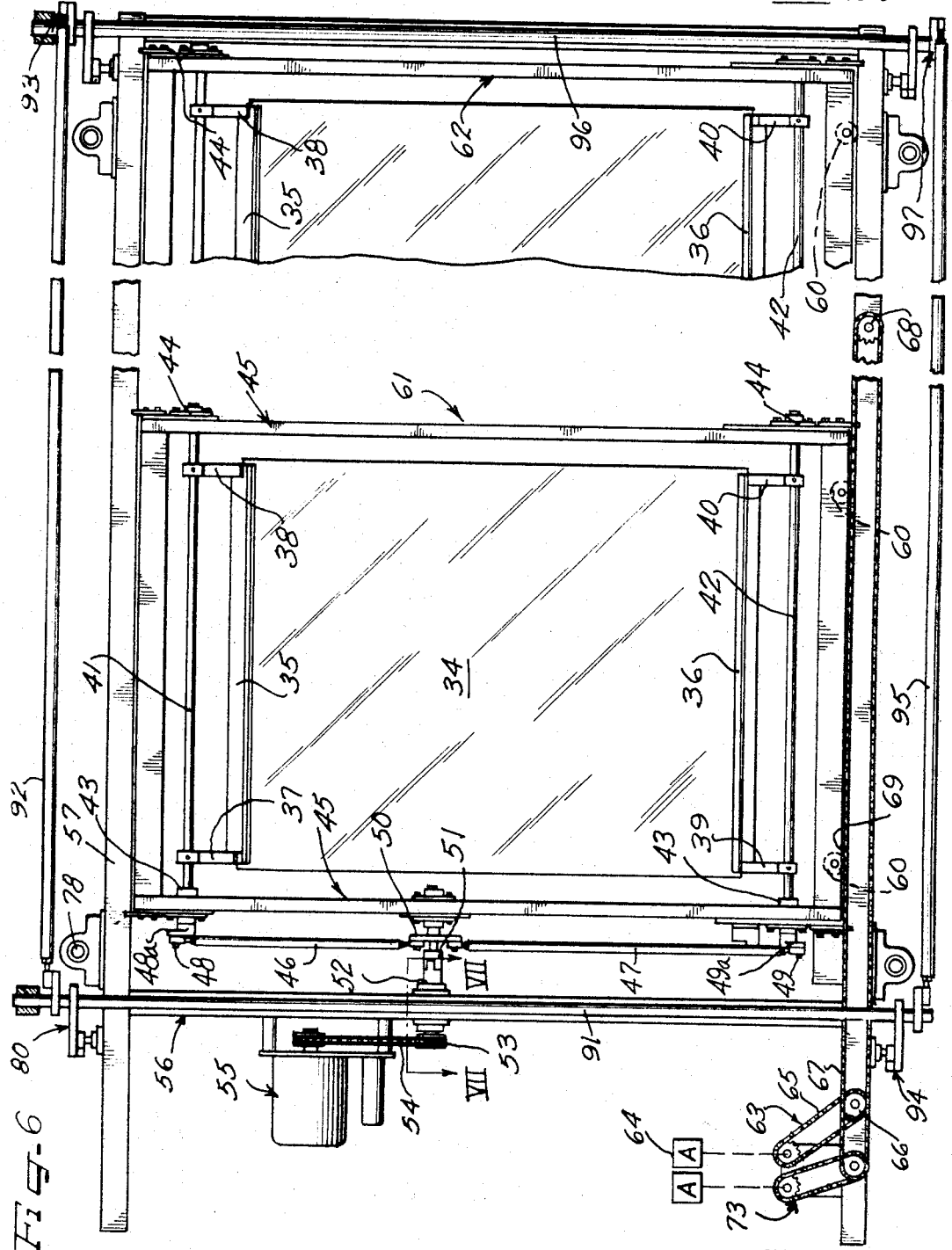

One of the initial steps in the preparation of printing plates for reproducing a pictorial representation in large quantities is to expose a photographic plate through a half-tone screen. Essentially, the half-tone screen is a mask which subdivides the image focused on the photographic plate into a series of discrete dot-like exposures which together resemble the original image and which is later used in the preparation of photographic printing plates having unique ink retaining qualities.

If the photographic printing plate which is the end product in the process of exposing a photographic film through a half-tone screen is to accurately represent the original image, the half-tone screen must be uniformly and smoothly applied to the surface of the film. For instance, if a bubble or ripple or other irregularity is formed in the half-tone screen after being applied to the film surface, the resulting exposure would be irregular in the region of the bubble ripple or other deformity and would generate a corresponding flaw in the resulting photographic printing plates.

In addition to the need for uniformly applying a half-tone screen to the surface of a film, it is desirable to provide a system for making various textured half-tone screens readily available to a user of a photomechanical or half-tone camera without the need for excessive handling and laborious interchanging of the half-tone screens. Half-tone screens of various textures or various grid sizes are required for various quality exposures and interchangeable availability significantly speed the operation of the photomechanical camera.

Accordingly it is an object of this invention to provide a means for uniformly and smoothly applying a flexible sheet to a receiving surface.

It is also an object of this invention to provide a device for uniformly and smoothly applying a flexible contact type half-tone screen to the surface of a photographic plate in a photomechanical camera.

It is another object of this invention to provide a device for moving a half-tone screen toward a vacuum film holder in a photomechanical camera to establish line contact and for then progressively contacting the half-tone screen against the film surface from one longitudinal edge thereof to the opposite longitudinal edge to establish continuous surface contact.

It is a further object of this invention to provide a linkage system for uniformly applying a first longitudinal edge of a half-tone screen to a vacuum film holder and for maintaining the half-tone screen in a taut position while progressively applying the remainder of the screen to the film holder.

It is a further object of this invention to provide a device for applying a half-tone screen obliquely to the surface of a film in a vacuum film holder and for utilizing the vacuum bias of the film holder for uniformly and smoothly moving the half-tone screen into progressive contact with the associated film.

It is an additional object of this invention to provide a system for storing a plurality of half-tone screen racks having the features of this invention which racks may be slidably moved into the exposure path of the vacuum film holder and subsequently advanced along the exposure path into a position for applying the half-tone screen to the surface of the associated film wherein each of the half-tone screen racks may be readily interchangeably positioned adjacent the vacuum film holder for applying the associated screen to the surface of the photographic film.

These and other objects, features and advantages of the present invention will be understood from the following description and the associated drawings wherein reference numerals are utilized in designating an illustrative embodiment thereof.

On the drawings:

FIGURES 1, 2 and 3 are diagrammatic representations of a vacuum film holder and an associated half-tone screen as mounted on a manipulating or linkage means according to this invention and showing successive steps in moving the half-tone screen toward the vacuum film holder in an oblique manner to initially establish line contact and for progressively contacting the surface of the film from one longitudinal edge thereof to the opposite longitudinal edge in full surface contact;

FIGURE 4 is an end view of a system for supporting a plurality of half-tone screen racks of the type illustrated in FIGURES 1, 2 and 3 and for making those racks readily available when needed for being positioned adjacent the exposure surface of a film and vacuum film holder;

FIGURE 5 is a partially sectioned view as taken along the lines V—V of FIGURE 4 and showing the track mechanism for sliding the half-tone screen racks laterally into the exposure path and showing a further track mechanism for advancing the half-tone screen rack toward the vacuum film holder and into a position for applying the half-tone screen against the surface of the associated photographic film;

FIGURE 6 is a front view of a system as shown in FIGURE 4 and as diagrammatically illustrated in FIGURES 1, 2 and 3 for applying the half-tone screen to the surface of a photographic film and for making a number of half-tone screens readily available in a photomechanical camera, and FIGURE 7 is a sectional view taken along the lines VII—VII of FIGURE 6 and showing the means for readily engaging the half-tone screen racks with the motor drive assembly shown in FIGURE 6.

As shown on the drawings:

A vacuum operated film holder 10 is shown generally in FIGURES 1, 2 and 3 as having a plurality of suction openings 11 through which a vacuum bias is applied for maintaining a photographic plate 12 against the surface 13 of the film holder 10.

A flexible contact type half-tone screen 14 is mounted to a linkage system 15, and the entire assembly is positioned relative to the photographic plate 12 such that operation of the linkage system 15 will cause the half-tone screen to be placed in surface contact with the photographic plate or film 12 as is required for the eventual preparation of photographic printing plates.

The half-tone screen 14 is a flexible sheet which is mounted at upper and lower brackets or clamps 16 and 17 respectively. The clamps 16 and 17 are then fixedly attached to L-shaped arms or cranks 18 and 19 which are pivotally mounted at pivots 20 and 21. The pivots 20 and 21 are fixedly positioned relative to the vacuum film holder 10. It is apparent from FIGURES 1, 2 and 3 that rotation of the L-shaped arms 18 and 19 about the fixed pivot points 20 and 21 will translate the screen 14 from one lateral plane to a shifted position in a different lateral plane spaced from the first position by a discrete transverse spacing dimension and will thus cause the flexible half-tone screen 14 to be moved into surface contact with the photographic plate or film 12. However, means must be provided to move the half-tone screen 14 against the photographic plate 12 in such a manner as to assure that there will be no bubbles, ripples, wrinkles or irregularities in the contact of the screen and film which would produce flaws in the subsequently produced photographic printing plates.

Such a means is provided in the form of the linkage system 15. The linkage system 15 consists of three linkage segments 22, 23 and 24 which are pivotally interconnected at intermediary points 25 and 26. The center linkage 23 is pivoted at a point 27 which is fixedly mounted relative to the vacuum film holder 10.

The pivot points 25 and 26, however, are freely movable relative to the vacuum film holder 10 as is illustrated in FIGURES 1, 2 and 3. The outer linkage arms 22 and 24 are pivotally connected at the points 28 and 29 to the L-shaped arms 18 and 19. While the pivot points 20 and 21 are fixedly mounted relative to the vacuum film holder 10, the pivot points 28 and 29, as the pivot points 25 and 26, are freely movable relative to the vacuum film holder 10. It is apparent therefore that rotation of the intermediary arm 23 about the fixed pivot point 27 will cause the movement of the outer arms 22 and 24 in such a manner as to effect rotational movement or angular displacement of the L-shaped arms 18 and 19. As is shown in the drawings, this rotational movement of the L-shaped arms 18 and 19 has been gauged to obliquely apply the half-tone screen 14 uniformly and smoothly to the surface of the photographic plate or film 12. Thus, initially a line contact between the screen and the face of the film support is effected whereupon the screen is virtually stretched or progressively engaged to promote a smooth bubble free full surface contact.

The successive operations shown in FIGURES 1, 2 and 3 are generated by a counterclockwise rotation of the intermediary linkage 23 about the stationary pivot point 27. As the linkage 23 is rotated counterclockwise from the position shown in FIGURE 1, the upper linkage 24 is moved generally downwardly for rotating the L-shaped arm 18 in a clockwise direction. Likewise the lower linkage arm 22 is moved generally upwardly for rotating the L-shaped arm 19 in a counterclockwise direction. Accordingly the counterclockwise rotation of the intermediary linkage 23 will cause rotation of the L-shaped arms 18 and 19 in a direction for advancing the half-tone screen 14 toward the surface 30 of the photographic plate or film 12.

In order to move the arms 18 and 19 non-uniformly toward the surface 30 of the film 12, and thereby avoid the possibility of the half-tone screen 14 becoming slack and contacting surface 30 in a non-uniform manner as to develop bubbles, ripples, wrinkles or other surface irregularities, means are provided to advance one of the L-shaped arms toward the surface of the photographic plate prior to the equal advancement of the other L-shaped arm. In this way, one longitudinal edge of the half-tone screen 14 is moved toward the vicinity of the photographic plate 12 and of the vacuum film holder 10 to establish line contact while the other longitudinal edge is held in spaced relation with the film and film holder for being subsequently moved into the vicinity of the film. By causing rotation of one of the L-shaped arms to lag the rotation of the other arm, the screen is effectively applied to the film obliquely or at a continuous angle such that the suction created by the vacuum film holder will progressively ease the screen into surface contact with the film from one longitudinal edge thereof to the opposite longitudinal edge.

In FIGURE 1, for instance, the L-shaped arm 19 is angularly positioned about the fixed pivot point 21 such that the clamp 17 is spaced further than the clamp 16 from the respective edges of the film holder 16. Also, the linkage 22, 23 and 24 are pivoted in such a manner as to cause the arm 18 to rotate faster than the arm 19. The result is that when the intermediary arm 23 is rotated counterclockwise to the screen into surface contact with the film from one longitudinal edge thereof to the opposite longitudinal edge.

In FIGURE 1, for instance, the L-shaped arm 19 is angularly positioned about the fixed pivot point 21 such that the clamp 17 is spaced further than the clamp 16 from the respective edges of the film holder 10. Also, the linkages 22 and 24 are of different length, the link arm 22 being shorter so that the effective throw of the crank 18 will occur at an earlier sequence than the throw of the crank 19.

Further, the fulcrum established at 27 for the lever arm 23 is closer to the pivot point 25 than it is to the pivot point 26. The result is that when the connecting link 23 is rotated counterclockwise to the position shown in FIGURE 2, the half-tone screen 14 is caused to contact the film 12 in the region 31 while the opposite region 32 of the screen 14 is maintained in a spaced relation with the surface 30 of the film. It is this angled relationship of the half-tone screen 14 with the film 12 and progressive feed-in characteristic which is referred herein as the oblique relationship of the film and screen. This oblique relationship aids the uniform wrinkle free application of the screen 14 to the surface of the film 12.

In particular, the suction bias appearing at the vacuum film holder 10 causes the screen 14 to be uniformly drawn as at the point 33 to the surface 30 of the film 12. This uniform drawing of the screen against the surface 30 is accomplished progressively from regions of the screen adjacent the clamp 16 to the regions of the film adjacent the clamp 17. In this way, bubbles, ripples and other irregularities in the contact of the screen at the film surface are eliminated. The result is that the screen 14 is evenly and smoothly applied to the surface of the film as shown in FIGURE 3.

The device for applying the half-tone screen 14 to the surface of the film 12 as shown in FIGURES 1, 2 and 3 may be incorporated into a photomechanical camera as illustrated in FIGURES 4, 5, 6 and 7. In particular, a flexible contact type half-tone screen 34 may be held in a taut position between longitudinal edge clamps 35 and 36. The clamps are mounted to arms 37, 38, 39 and 40 which are affixed to shafts 41 and 42. The shafts 41 and 42 are journalled as at 43 and 44 in a half-tone screen rack or frame 45. Outer linkages 46 and 47 which are similar to the linkages 24 and 22 of FIGURE 1, are pivotally mounted at pivots 48 and 49 respectively which are connected through arms 48a and 49a to the associated shafts 41 and 42. An intermediary linkage 50 is connected between the arms 46 and 47 and is fixedly mounted to a connector 51, which is in turn linked to a coupling 52. The coupling 52 is connected through a pulley 53 and V-belt 54 to a drive motor 55. The drive motor 55 is mounted on a frame 56.

The operation of the drive motor 55 will rotate the intermediary linkage 50 in a manner illustrated in FIGURES 1, 2 and 3 for moving the half-tone screen 34 into surface contact with the photographic plate 12. However, the contact screen and associated linkage assembly must first be placed in a proper position adjacent to the surface of the photographic plate or film prior to the operation of the drive motor 55. Accordingly, the system shown in FIGURES 4 through 7 provides a means for readily positioning a selected half-tone screen into position adjacent the photographic film.

As shown in FIGURES 4 through 7, it is contemplated by the present invention that means are provided for storing the half-tone screen racks in a position out of the exposure path of the film and for moving the half-tone screen racks into an exposure position adjacent the associated film support surface. In particular, the half-tone screen rack 45 is slidably movable on a rail 57 at a bracket 58. The rack 45 is also operated on a lower rail 59 at rollers 60. In this way, the rack 45 can be slidably moved laterally with respect to the film 12 such that the entire rack may be positioned as at 61 in FIGURE 6 which is directly on the optical axis of the camera and hence within the exposure path of the film 12 or at 62 which is laterally displaced from the optical axis or exposure path of the film 12.

The half-tone screen rack 45 may be moved along the rails 57 and 59 by a chain drive mechanism 63 which consists of an actuator 64, a drive belt 65, a drive wheel 66 and a chain 67 which extends around the drive wheel 66 and a guide wheel 68 and which is attached to the base of the half-tone screen rack 45 as at the point 69. The half-tone screen rack 45 is supported on the cooperable rails 57 and 59 and is moved along the rails through the chain drive mechanism 63.

Several half-tone screen racks such as the rack 70 may be aligned alongside the initial rack 45 and stored, when not in use, in the laterally displaced position relative to the film surface. The half-tone screen rack 70 is likewise supported on rails 71 and 72 and is moved forwardly and rearwardly along those rails through a chain drive mechanism 73 which is similar in character to the chain drive mechanism 63.

However, if a number of half-tone screen racks are filed in a side-by-side position for being moved into the exposure path a optical axis of the camera during use, means must be provided for advancing the half-tone screen racks, such as the rack 70 in a direction along the exposure path to a position adjacent the film 12 such that operation of the motor 55 will properly position the screen against the surface of the film and film holder. For this purpose, the tracks 57, 59, 71 and 72 are mounted on brackets 74 and 75 which in turn are slidably positioned at collars 76 and 77 about shafts 78 and 79.

When the half-tone screen 45 is moved in a storage position, for instance, and the half-tone screen 70 is moved into a position within the exposure path, the brackets 74 and 75 must be moved along the exposure path to position the half-tone screen rack 70 immediately adjacent the film holder 10.

To move the rack 70 along the shaft 78, a linkage device 80 is provided. In particular, the linkage device 80 comprises a pivot arm 81 and a swivel arm 82 which are linked together as at 83 in FIGURE 5. The swivel arm 82 is pivotally connected at 84 to a bracket 85 which is rigidly attached as at 86 and 87 to the rails 57 and 71. The pivot arm 81 is rotatably mounted about a pivot point 88, and when the arm 81 is rotated in a counterclockwise direction as shown in FIGURE 5, the swivel arm 82 causes the fixed assembly of rails 57 and 71 to move in the direction of the arrow 89 for properly positioning the half-tone screen rack 70 immediately adjacent the film holder 10.

The pivot arm 81 may be rotated by an actuator 90 which through vertical and horizontal rods 91 and 92 causes the rotary motion of the pivot arm 81 to be transmitted to similar linkage assemblies as shown at 93 and 94 in FIGURE 6. Further rods 95 and 96 extend from the linkage assemblies 94 and 93 respectively to a fourth linkage assembly 97 which is also actuated simultaneously by the actuator 90.

Accordingly the system shown in FIGURES 4 through 7 provides a means for storing a number of half-tone screen racks out of position with respect to the film holder 10 and for readily sliding the racks laterally into the exposure path and for subsequently advancing the selected rack along the exposure path toward the film holder 10.

To allow the selected half-tone screen rack to be operated by a single drive mechanism such as the mechanism 55, the fittings 51 and 52 are provided in combination as shown in FIGURE 7. The drive motor 55 is mounted on the bracket 56 which is securely attached to the rails 57 and 71, and accordingly movement of the rail assembly will move the drive motor 55. In order to engage each of the racks 45 or 70 with the motor 55, a dual coupling system consisting of the coupling 52 and an associated coupling 52a is provided at the intervals necessary to receive the associated half-tone screen racks. A common V-belt 54 may be used to drive the pulley 53 and an associated pulley 53a. In this way, when the rack 45 is moved laterally along the rails 57 and 59 into the exposure path, the fitting 51 will engage the coupling 52 and be accordingly linked to the drive motor 55. Similarly, when the rack 70 is moved laterally into the exposure path along the rails 71 and 72, a fitting similar to the fitting 51 will engage the coupling 52a which is likewise connected through the V-belt 54 to the drive motor 55. After the half-tone screen rack 70 is moved into engagement with the coupling 52a, the entire rack assembly including the coupling and drive motor 55 will be advanced along the exposure path to a position immediately adjacent the film holder such as the position occupied by the half-tone screen rack 45 in FIGURE 4. When in the position of the rack 45 in FIGURE 4, the motor 55 will be actuated for operating the associated linkages and applying the half-tone screen obliquely to the surface of the film and film holder as shown in FIGURES 1, 2 and 3.

Accordingly this invention provides a means for efficiently and effectively applying a flexible half-tone screen to the surface of a film and film holder and for making a plurality of different textured half-tone screens readily available to the user of a photomechanical camera.

It will be understood that various modifications and combinations of the features described herein may be accomplished by those versed in the art, but we desire to claim all such modifications and combinations as properly come within the spirit and scope of our contributions to the art.

We claim as our invention:

1. A device for applying a flexible sheet to a receiving surface comprising:

vacuum means for generating an air flow toward the receiving surface, first and second grip means for holding the flexible sheet respectively at first and second opposite longitudinal edges thereof, first manipulating means for moving the first grip means toward the receiving surface and into the influence of the air flow generated by the vacuum means, said first manipulating means causing portions of the flexible sheet adjacent the first grip means to contact the receiving surface, second manipulating means for moving the second grip means toward the receiving surface and into the influence of the air flow generated by the vacuum means, said second manipulating means causing portions of the flexible sheet adjacent the second grip means to contact the receiving surface at a later time than said first manipulating means and causes portions of the flexible sheet adjacent the first grip means to contact the receiving surface, whereby the flexible sheet is caused to adhere to the receiving surface uniformly and progressively from portions adjacent the first grip means to portions adjacent the second grip means, said first and second manipulating means comprising first and second arms pivotally mounted relative to the receiving surface and connected respectively to said first and second grip means, means for rotating the first and second arms toward the receiving surface, and the rotation of said second arm lagging the rotation of the first arm relative to the receiving surface.

2. A device in accordance with claim 1 wherein the first and second arms are pivoted adjacent opposite longitudinal edges of the receiving surface and wherein said arms extend generally toward each other and wherein the degree of rotational lag of the second arm relative to the first arm maintains a substantial equal spacing between the first and second grip means during rotation of the arms to assure a substantially taut movement of the flexible sheet.

3. A device in accordance with claim 2 which includes means for rotating the first and second arms away from the receiving surface and wherein one of the first and second arms is rotated therefrom prior to the rotation of the other arm thereby causing the flexible sheet to be peeled away from the receiving surface.

4. A device in accordance with claim 1 including means for moving one of the grip means away from the receiving surface and for progressively peeling the flexible sheet off the receiving surface from the one grip means to the other grip means.

5. In a halftone camera a device for uniformly applying a halftone screen against a film supported on a previous vacuum film holder comprising:
first and second screen clamps for uniformly gripping the halftone screen at opposite longitudinal edges thereof,
means for maintaining the halftone screen substantially taut between the first and second screen clamps and in spaced relation with the film and holder surface,
means for advancing the first and second screen clamps toward the film holder with said second screen clamp lagging said first screen clamp,
said halftone screen first reaching a contact position at the surface of the film and holder in the vicinity of the first screen clamp and progressively contacting the film and holder surface from the region of the first screen clamp to the region of the second film clamp,
said first and second screen clamps being pivotally supported adjacent opposite edges of the film holder and wherein one of the screen clamps is rotated to a position adjacent the film and holder surface prior to the rotation of the other clamp to a position adjacent the film and holder surface whereby the suction generated by the vacuum film holder causes the halftone screen to be progressively urged against the film and holder surface from the region of the one screen clamp to the region of the other screen clamp.

6. A halftone camera in accordance with claim 5 wherein a guide linkage interconnects the first and second pivotally supported clamps for simultaneously rotating the clamps and the screen toward the film holder and wherein the start of rotation point of one of the clamps lags the start of rotation point of the other clamp, whereby the halftone screen is obliquely moved toward the film holder.

7. A system for supplying and applying halftone screens to the surface of a film supported in a vacuum film holder comprising:

a number of screen racks filed in storage position out of the film exposure path,
means for sliding one of the screen racks laterally from the storage position into an exposure position in alignment with the film holder and with the film exposure path,
means for advancing the screen rack within the exposure position toward the exposure surface of the film and film holder,
each of said screen racks having a halftone screen mounted therein,
said halftone screens having clamp means at opposite longitudinal edges thereof,
said clamp means being pivotally mounted on the racks,
means interconnecting the clamp means for rotating one of the clamp means toward the film holder in an advanced relationship with the simultaneous rotation of the other clamp means, such that the screen may be obliquely applied to the film surface, and
means for rotating one of the clamp means away from the film surface in an advanced relationship with the simultaneous rotation of the other clamp means such that the screen is peeled from the surface of the film and film holder.

8. A system in accordance with claim 7 wherein different exposure screens are mounted in different screen racks and wherein each screen rack is interchangeably positionable adjacent to the exposure surface of the film and film holder by sliding the selected rack laterally from the storage position to the exposure path and by advancing the rack along the exposure path to the desired spaced position adjacent to the exposure surface of the film and film holder.

9. A system in accordance with claim 8 wherein the halftone screen in maintained in a substantially taut position between the clamp means and wherein the clamp means are pivoted in a direction generally toward each other at opposite longitudinal edges of the film holder and wherein the lagging rotation of one of the clamps maintains a substantially taut positioning of the screen during the oblique application of the screen to the film surface.

10. A system in accordance with claim 9 wherein the suction provided by the vacuum film holder causes the halftone screen to be bowed toward the film holder during the oblique movement of the screen toward the film and film holder, whereby the screen is uniformly applied to the exposure surface of the film.

References Cited

UNITED STATES PATENTS 3,063,337   11/1962   Anander _____ 88—24

NORTON ANSHER, *Primary Examiner.*

R. A. WINTERCORN, *Assistant Examiner.*

U.S. Cl. X.R.

355—40